(12) United States Patent
Benjamin et al.

(10) Patent No.: US 9,507,095 B2
(45) Date of Patent: Nov. 29, 2016

(54) EXPANDED BEAM OPTICAL CONNECTORS AND METHODS FOR USING THE SAME

(71) Applicant: CORNING OPTICAL COMMUNICATIONS LLC, Hickory, NC (US)

(72) Inventors: Seldon David Benjamin, Painted Post, NY (US); Robert Adam Modavis, Painted Post, NY (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 34 days.

(21) Appl. No.: 14/283,346

(22) Filed: May 21, 2014

(65) Prior Publication Data

US 2015/0003783 A1    Jan. 1, 2015

Related U.S. Application Data

(60) Provisional application No. 61/840,067, filed on Jun. 27, 2013.

(51) Int. Cl.
*G02B 6/38* (2006.01)
*G02B 6/32* (2006.01)
*G02B 6/36* (2006.01)
*G02B 6/42* (2006.01)

(52) U.S. Cl.
CPC ............ *G02B 6/3853* (2013.01); *G02B 6/3885* (2013.01); *G02B 6/4292* (2013.01); *G02B 6/3849* (2013.01); *G02B 6/4206* (2013.01)

(58) Field of Classification Search
CPC .... G02B 6/32; G02B 6/4206; G02B 6/3853; G02B 6/36; G02B 3/0087

USPC ...................... 385/33, 35, 61, 72, 74, 79, 93
See application file for complete search history.

(56) References Cited

U.S. PATENT DOCUMENTS 6,012,852 A   1/2000   Kadar-Kallen et al. ........ 385/74
6,990,136 B2  1/2006   Akiyama et al. ............. 372/101
(Continued)

OTHER PUBLICATIONS

Amphenol Fiber Optic Solutions, Expanded Beam CTOS-CTOL Brochure, 17 pages, retrieved on Apr. 24, 2014 from http://www.amphenol-fiberopticsolutions.com.
(Continued)

*Primary Examiner* — Kaveh C Kianni
*Assistant Examiner* — Hung Lam

(57) ABSTRACT

An expanded beam optical connector including a connector body, an optical element in the form of a waveguide or active device, a beam width altering optical lens, and a transmit/receive window. The optical element, the beam width altering optical lens, and the transmit/receive window are configured such that optical signals propagate between the optical element and the transmit/receive window via the beam width altering optical lens. The transmit/receive window includes an optical medium that forms an interior surface of the transmit/receive window, an optical transition layer between the interior surface formed by the optical medium, and a protective layer forming an exterior surface of the transmit/receive window. The connector body is configured to place the exterior surface of the transmit/receive window in close contact with a mating exterior surface of a mating transmit/receive window of a complementary optical device to define a close contact portion.

21 Claims, 5 Drawing Sheets

(56) References Cited

U.S. PATENT DOCUMENTS

2008/0080812 A1* 4/2008 Kobayashi et al. ............ 385/35
2009/0324175 A1* 12/2009 Everett et al. ................. 385/72
2012/0033917 A1* 2/2012 Fortusini et al. ............... 385/72

OTHER PUBLICATIONS

P. R. Cooper, et al., "A fibre optic connector suitable for use in a rugged environment," Optics and Laser Technology, Apr. 1982, pp. 87-91.

* cited by examiner

EXPANDED BEAM OPTICAL CONNECTORS AND METHODS FOR USING THE SAME

CROSS-REFERENCE TO RELATED APPLICATIONS

This application claims the benefit of priority under 35 U.S.C. §119 of U.S. Provisional Application Ser. No. 61/840,067, filed on Jun. 27, 2013, the content of which is relied upon and incorporated herein by reference in its entirety.

BACKGROUND

This disclosure relates generally to optical communication and, more particularly, to low-loss optical connectors and methods for low-loss optical communication Short-distance data links used for consumer electronics are reaching increasingly higher data rates, especially those used for video and data storage applications. Examples include the USB 3.0 protocol at 5 Gb/s, HDMI at 10 Gb/s and Thunderbolt™ at 10 Gb/s over two channels. At such high data rates, traditional copper cables can have limited transmission distance and cable flexibility. For at least these reasons, optical fiber is emerging as an alternative to copper wire for accommodating the high data rates of advancing generations of electronic devices such as consumer devices.

Unlike telecommunication applications that employ expensive, high-power edge-emitting lasers along with modulators, short-distance optical fiber links can be based on low-cost, low-power, directly modulated light sources such as vertical-cavity surface-emitting lasers (VCSELs). Optical-to-optical fiber optic connectors for optical cable assemblies can communicate optical signals to and from mated, aligned optical fibers. Such optical-to-optical fiber optic connectors are becoming increasingly viable for use in consumer electronics and other electronics. The performance of the optical-to-optical fiber optic connectors can be impacted, i.e., the amount of optical signal loss, by alignment between mated connectors used to couple optical signals.

Accordingly, a need exists for alternative expanded beam optical connectors and methods for forming optical connections with an expanded beam optical connector.

SUMMARY

One embodiment of the disclosure relates to an expanded beam optical connector that can include a connector body, an optical element in the form of waveguide or active device, a beam width altering optical lens, and a transmit/receive window. The optical element, the beam width altering optical lens, and the transmit/receive window can be arranged and structurally configured such that optical signals propagate between the optical element and the transmit/receive window via the beam width altering optical lens. The beam width altering optical lens can alter a beam width of the optical signals. The transmit/receive window can include an optical medium that forms an interior surface of the transmit/receive window, an optical transition layer between the interior surface formed by the optical medium, and a protective layer forming an exterior surface of the transmit/receive window. The connector body can be structurally configured and arranged to place the exterior surface of the transmit/receive window in close contact with a mating exterior surface of a mating transmit/receive window of a complementary optical device to define a close contact portion on the transmit/receive window and the mating transmit/receive window.

The optical medium may a first refractive index, the optical transition layer may have a second refractive index, and the protective may have a third refractive index, with the second refractive index of the optical transition layer being greater than the first refractive index of the optical medium and less than the third refractive index of the protective layer. The optical medium may have a refractive index of about 1.5, for example, as may be the case if the optical medium comprises glass, and the protective layer may have a refractive index of about 2, for example, as may be the case if the protective layer comprises a diamond-like carbon. The optical transition layer in such embodiments may then be between 1.5 and 2, for example about $\sqrt{3}$.

An additional embodiment of the disclosure relates to an optical connector assembly that can include an expanded beam optical connector and a complementary optical device. The expanded beam optical connector can include a mating feature, an optical element in the form of a waveguide or active device, a beam width altering optical lens, a transmit/receive window. The transmit/receive window can include an optical medium that forms an interior surface of the transmit/receive window, an optical transition layer between the interior surface formed by the optical medium and a protective layer forming an exterior surface of the transmit/receive window. The complementary optical device can include a complementary mating feature, and a mating optical window having a mating exterior surface formed from a protective layer. The mating feature of the expanded beam optical connector and the complementary mating feature of the complementary optical device can be engaged. The mating exterior surface of the mating optical window can be held in close contact with the exterior surface of the transmit/receive window to define a close contact portion on each of the mating exterior surface of the mating optical window and the exterior surface of the transmit/receive window. Optical signals can be transmitted through the close contact portion of the transmit/receive window. The optical signals can be communicated between the transmit/receive window and the beam width altering optical lens. The beam width altering optical lens can alter a beam width of the optical signals. The optical signals can be communicated between the beam width altering optical lens and the optical element.

According to a further embodiment, a method for forming an optical connection across an expanded beam optical connector and a complementary optical device is provided. The expanded beam optical connector can include a connector body, an optical element in the form of a waveguide or active device, a beam width altering optical lens, and a transmit/receive window. The optical element, the beam width altering optical lens, and the transmit/receive window can be arranged and structurally configured such that optical signals propagate between the optical element and the transmit/receive window via the beam width altering optical lens. The beam width altering optical lens can alter a beam width of the optical signals. The transmit/receive window can include an optical medium that forms an interior surface of the transmit/receive window, an optical transition layer between the interior surface formed by the optical medium, and a protective layer forming an exterior surface of the transmit/receive window. The complementary optical device can include a mating optical window having a mating exterior surface formed from a protective layer as well. The connector body of the expanded beam optical connector can be structurally configured and arranged to place the exterior surface of the transmit/receive window of the expanded beam optical connector in close contact with the mating exterior surface of the mating optical window of the complementary optical device to define a close contact portion on the exterior surface of the transmit/receive window and the mating exterior surface of the mating optical window. The method may include connecting the expanded beam optical connector and the complementary optical device to brace the transmit/receive window of the expanded beam optical connector against the mating optical window of the complementary optical device to define the close contact portion on the transmit/receive window of the expanded beam optical connector and the mating optical window of the complementary optical device.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
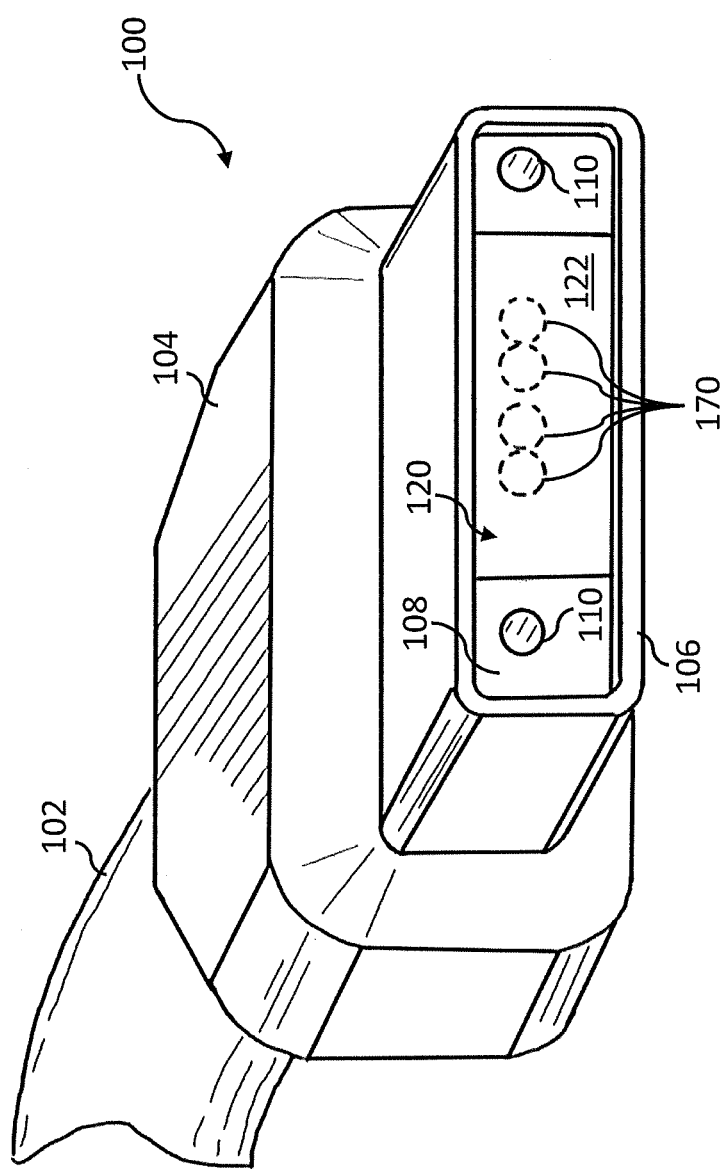
FIG. 1 is a perspective view of one embodiment of an expanded beam optical connector.

FIG. 1 generally depicts one embodiment of an expanded beam optical connector. The expanded beam optical connector generally comprises a connector body, an optical window, an optical lens and an optical element in the form of a waveguide (e.g., an optical fiber) or active device (e.g., a light source or light detector). Various embodiments of the expanded beam optical connector and the operation of the expanded beam optical connector will be described in more detail herein.

Expanded beam optical connectors may perform similar functions as device-device optical connectors or optical-to-optical fiber optic connectors because a first device (e.g., a fiber optic connector of an optical cable assembly) is optically coupled to a second device (e.g., a fiber optic receptacle of an electronics device, such as a consumer electronics device (e.g., mobile phone, personal computer, etc.)) by direct connection. Accordingly, light signals can be passed between two coupled devices to provide optical communication there between.

Referring now to FIG. 1, the expanded beam optical connector 100 can comprise a connector body 104 comprising a mating feature 106 that interfaces with a corresponding mating feature (not depicted) on a complementary optical device. For example, the connector body 104 can be shaped as a plug with the connector body 104 attached to a cable 102, such that the mating feature 106 is configured to connect to a receptacle. Specifically, the mating feature 106 can be a mechanical member, magnetic member, or both that cooperates with another object to provide structural support and physical alignment. Examples of such a mating feature include a detent, a keyed member, a catch, a fastener, a magnet and the like. Alternatively, the connector body 104 can be shaped as a receptacle such that the mating feature 106 is configured to connect to a plug. As used herein, the term "receptacle" is generally used to denote a connection device that is mounted on a host device such as, for example, mobile phone, personal computer, and the like. The term "plug" is generally used to denote a connection device that is attached to a cable. Accordingly, although the mating feature 106 is substantially rectangular in shape in the illustrated embodiment, other configurations are also possible. It is noted that a "complementary optical device" is an optical device that is designed for self-supported engagement with the expanded beam optical connector via a mating feature of the connector and a complementary mating feature of the optical device. For example, the self-supported engagement of the expanded beam optical connector 100 and the complementary optical device can be configured to brace the expanded beam optical connector 100 and the complementary optical device together and resist the separation of the expanded beam optical connector 100 and the complementary optical device such as, for example, via mated mechanical or magnetic members.

The connector body 104 can further comprise a window support member 108 that is configured to provide mechanical support for attaching an optical window 120 to the connector body 104. It is noted that, while the window support member 108 is depicted as being located within the mating feature 106, the window support member 108 can be provided in alternative locations on the connector body 104 with respect to the mating feature 106. For example, window support member 108 can be offset from the mating feature 106 or the mating feature 106 can be provided within the window support member 108.

The connector body 104 can further comprise one or more alignment features 110 for aligning the optical window 120 with another optical communication device. The one or more alignment features 110 can be formed on or within the window support member 108. For example, the one or more alignment features 110 can be a bore formed in the window support member 108 and may be operable to receive alignment pins (not depicted) of a complementary optical device to align respective lenses for optical communication. In other embodiments, no alignment features are provided. Alternatively or additionally, further mechanical alignment features and/or magnetic alignment features may be provided.

Figure 2:
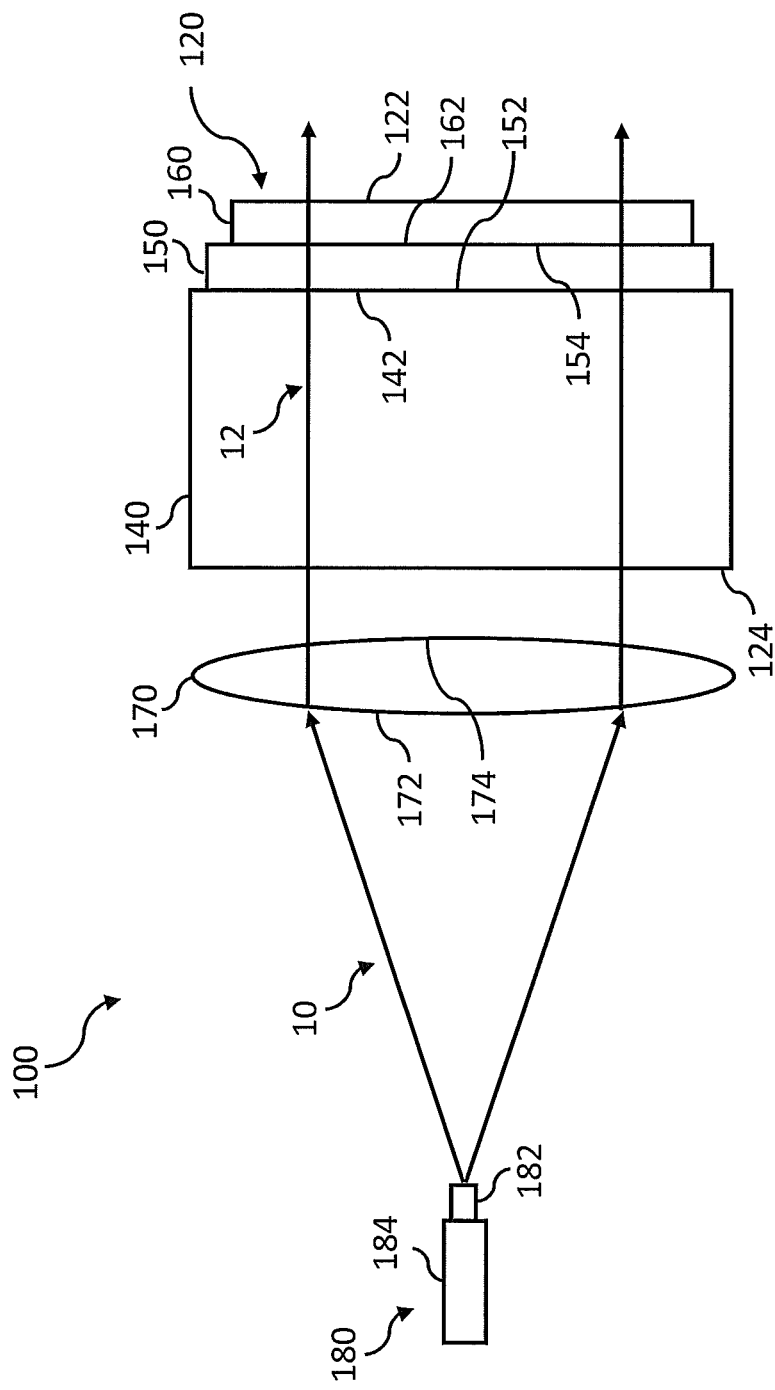
FIG. 2 is a schematic view of one embodiment of an expanded beam optical connector.

Referring collectively to FIGS. 1 and 2, an optical window 120 can be provided for isolating one or more optical lenses 170 from environmental conditions outside of the expanded beam optical connector 100. Additionally, the optical window 120 can be configured to provide an exterior surface 122 for mating with a complementary optical device for the transmission of an optical signal via the optical window 120. Accordingly, the exterior surface 122 of the optical window 120 can be substantially flat. The optical window 120 may have any appropriate dimensions. As an example and not a limitation, the dimensions of optical window 120 can be approximately 3.50×1.25×0.40 mm. It should be understood that other dimensions and surface contours may be utilized depending on the application such as, for example, curved surfaces, convex surfaces, canted surfaces, concave surfaces, corrugated surfaces, and any other shape that can be used for self-supported engagement.

Referring now to FIG. 2, in some embodiments, the optical window 120 can be a multilayered structure, i.e., layers of material can be disposed between the exterior surface 122 and the interior surface 124 of the optical window 120. The optical window 120 can comprise an optical medium 140 that is transmissive to optical signals. The optical medium 140 can be formed of any material that is transmissive to wavelengths of a collimated optical signal 12 such as, for example, a glass or polymer. In some embodiments, the optical medium 140 can have an index of refraction from about 1.2 to about 1.80 such as, for example, about 1.5 in one embodiment.

As an example and not a limitation, the optical medium 140 may be made of chemically strengthened aluminoborosilicate glass. In some embodiments, the optical medium 140 can be formed as a sheet. Specifically, the optical medium 140 can have a substantially uniform thickness between the interior surface 124 of the optical window 120 and the interface surface 142 of the optical medium 140. It is noted that, while the optical medium 140 is depicted as a sheet, the optical medium 140 can be provided in a plurality of shapes including shapes where the portion of the optical medium 140 that transmits the optical signal is substantially sheet-like, while other portions have non-uniform thickness.

The optical window 120 can comprise an optical transition layer 150 that is transmissive to optical signals. The optical transition layer 150 can be located between a plurality of layers of the optical window 120. In some embodiments, the optical transition layer 150 can have a substantially uniform thickness between a first interface surface 152 of the optical transition layer 150 and a second interface surface 154 of the optical transition layer 150. It is noted that, while the optical transition layer 150 is depicted as a sheet, the optical transition layer 150 can be provided in a plurality of shapes including shapes where the portion of the optical transition layer 150 that transmits the optical signal is substantially sheet-like, while other portions have non-uniform thickness. In some embodiments, the thickness of the optical transition layer 150 can be calibrated to the wavelength $\lambda$ of the collimated optical signal 12. For example, the optical transition layer 150 can have thickness of about $\lambda/4$. It is noted that the thickness can be calibrated to a range of wavelengths. Accordingly, the thickness of the optical transition layer 150 can be set based upon a range of wavelengths of optical signals.

The optical transition layer 150 can be formed of any material that is transmissive to light and capable of forming a durable bond with one or more layers of the optical window 120. Moreover, the material of the optical transition layer 150 can be selected based upon the index of refraction of the material. Specifically, the index of refraction of the optical transition layer 150 can have a value that is greater than the refractive index of the optical medium 140 and less than the refractive index of a protective layer 160 which will be described below. For example, in some embodiments, the index of refraction of the optical transition layer can be about equal to the square root of the product of the refractive index of the optical medium multiplied by the refractive index of the protective layer 160. Thus, if the refractive index of the optical medium is about 1.5 and the refractive index of the protective layer is about 2, for example, the refractive index of the optical transition layer may be about $\sqrt{3}$. A suitable material for these and some other embodiments is silicon oxynitride ($SiO_xN_y$), which has an index of refraction that can be tuned between about 1.45 and about 2.0 by changing the nitrogen/oxygen ratio in these films. It is noted that materials other than silicon oxynitride can be selected based upon the aforementioned criterion.

The optical window 120 can also comprise a protective layer 160 that is transmissive to optical signals. The protective layer 160 can comprise a diamond-like carbon. Indeed, the protective layer 160 will be referred to as a "diamond-like carbon layer" below for illustrative purposes, keeping in mind that diamond-like carbon is a non-limiting example of such a protective layer.

The diamond-like carbon layer 160 may be formed from amorphous hydrogenated or non-hydrogenated forms of carbon. Amorphous hydrogenated or non-hydrogenated forms of carbon can include $sp^3$ hybridized carbon atoms, $sp^2$ graphite or combinations thereof. Some embodiments include significant amounts of $sp^3$ hybridized carbon atoms. Some embodiments can be formed from a polymeric diamond-like carbon. The diamond-like carbon layer 160 can be characterized by properties that are correlated to the amount of $sp^3$ hybridized carbon atoms. For example, the hardness of the diamond-like carbon layer 160 can be from about 10 to about 80 GPa. The Berkovich method is one example how such hardness may be measured. In some embodiments, the hardness of the diamond-like carbon layer 160 can be can be greater than about 18 GPa. The Young's modulus of the diamond-like carbon layer 160 can be from about 60 to about 900 GPa. Additionally, the internal compressive stresses of the diamond-like carbon layer 160 can be from about 0.5 to about 7 GPa. The friction coefficient of the diamond-like carbon layer 160, measured in ambient air at relative humidity of about 20% to about 60%, can be from about 0.05 to about 1.00. In some embodiments, the diamond-like carbon layer 160 can have an index of refraction from about 1.85 to about 2.05 such as, for example, about 2.0 in one embodiment. Thus, in in some embodiments, the index of refraction of the optical transition layer can be about equal to the square root of the product of the refractive index of the optical medium multiplied by the refractive index of the protective layer 160. $\sqrt{3}$ In some embodiments, the diamond-like carbon layer 160 can have a substantially uniform thickness between the interface surface 162 of the diamond-like carbon layer 160 and the exterior surface 122 of the optical window 120. The thickness of the diamond-like carbon layer 160 can be set to any value suitable for transmission of optical signals and for maintaining the desired shape for the exterior surface 122 of the optical window 120. In some embodiments, the thickness of the diamond-like carbon layer 160 can be any value suitable to be substantially scratch resistant without absorbing too much of an optical signal, i.e., the thickness can be set to any desired value. In some embodiments, the thickness can be set to relatively thin values on the order of tens of $\mu m$ or less, such as, for example, less than about 5 $\mu m$ in one embodiment, or from about 500 nm to about 5 $\mu m$ in one embodiment. It is noted that, while the diamond-like carbon layer 160 is depicted as a sheet, the diamond-like carbon layer 160 can be provided in a plurality of shapes including shapes where the portion of the diamond-like carbon layer 160 that transmits the optical signal is substantially sheet-like, while other portions have non-uniform thickness. In some embodiments, the diamond-like carbon layer 160 can be formed such that the exterior surface 122 of the optical window 120 is substantially flat.

Figure 2A:
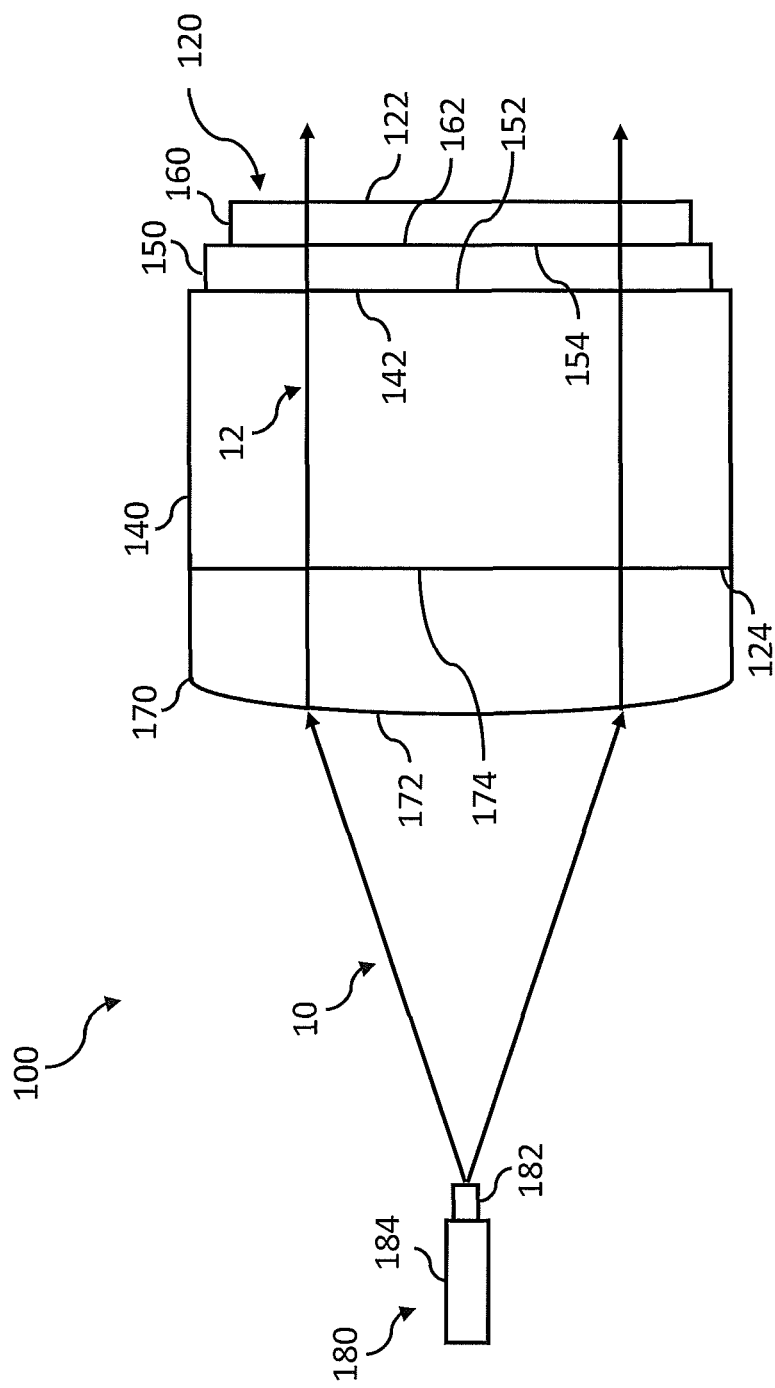
FIG. 2A is a schematic view of an alternative embodiment of an expanded beam optical connector.

The expanded beam optical connector 100 can further comprise an optical lens 170 for altering the beam width of the optical signal, i.e., the optical lens 170 can converge the signal, diverge the signal, or both. Accordingly, it is noted that while the optical lens 170 is depicted as a collimating lens, the optical lens 170 can perform additional beam altering functions. The optical lens 170 can be formed from any material that is transmissive to light in the wavelength of the light signals passing to and from the expanded beam optical connector 100. The optical lens 170 can be homogeneous or nonhomogeneous. The optical lens 170 can be configured to receive an optical signal at a first face 172 and transmit the optical signal at a second face 174. Each of the first face 172 and the second face 174 can be planar, concave, convex, or combinations thereof. Accordingly, the optical lens 170 can be shaped as a ball, rod, hemisphere, truncated sphere and the like. In some embodiments, each of the first face 172 and the second face 174 can be configured for input, output, or both. In other embodiments, only the first face 172 or second face 174 may be configured as such (thereby providing what is considered to be a single-sided lens element), as schematically illustrated in FIG. 2A.

Figure 2B:
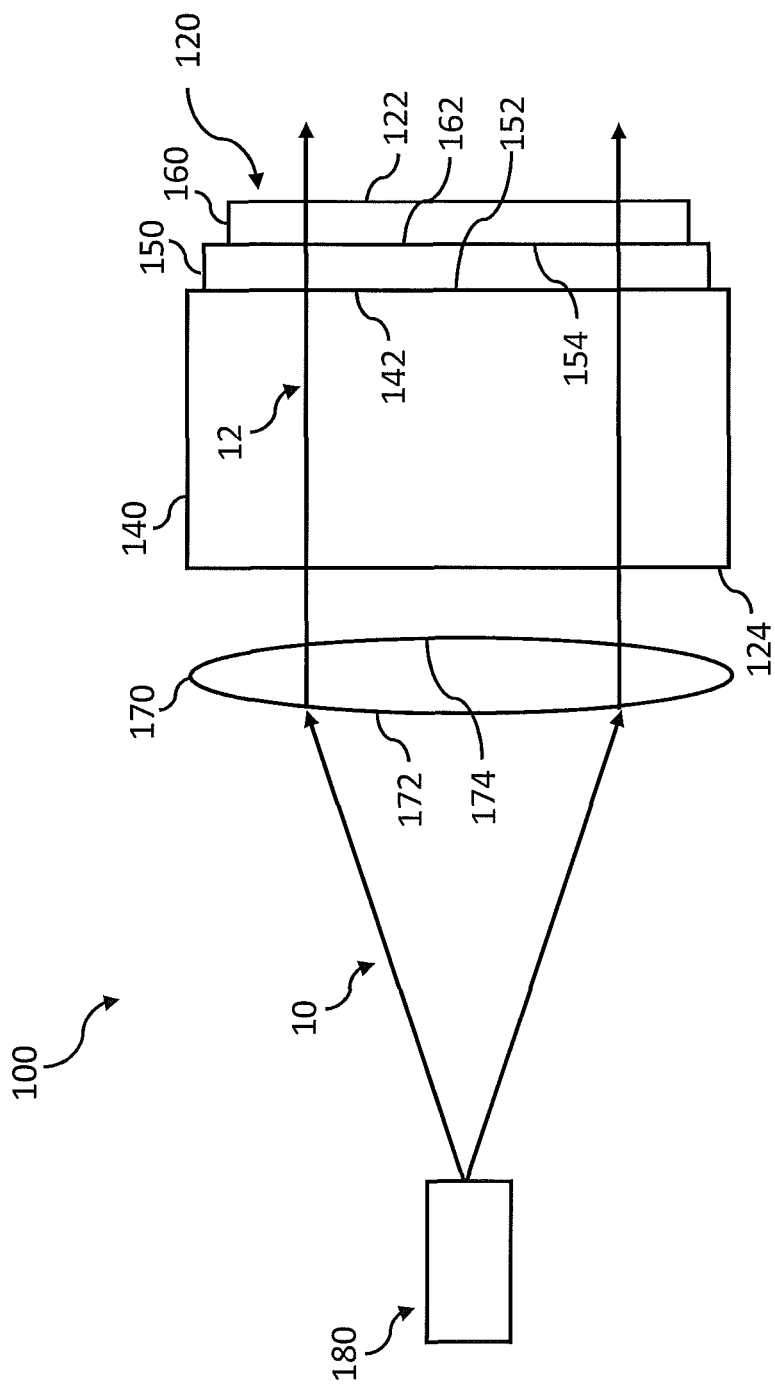
FIG. 2B is a schematic view of yet another embodiment of an expanded beam optical connector.

Referring back to FIG. 2, the expanded beam optical connector 100 can further comprise an optical element 180 for generating, receiving, and/or transmitting light. The optical element 180 may be in the form of a waveguide, such as an optical fiber, or an active device, such as a light source (e.g., a laser diode and specifically a vertical-cavity surface-emitting lase in some embodiments) or a light detector. An optical fiber is shown in FIG. 2 and described below for illustrative purposes. Accordingly, hereinafter the optical element 180 will be referred to as an optical fiber 180. Persons skilled in the art will appreciate, however, embodiments where there is not an optical fiber but rather an active device. The active device may be positioned relative to the optical lens 170 such that the emitting or detecting surface of the active device is effectively positioned where the end of the optical fiber is positioned in FIG. 2. FIG. 2B schematically illustrates such an arrangement.

Referring back to FIG. 2, the optical fiber 180 is configured to transmit light throughout the extent of the optical fiber 180. The optical fiber 180 can comprise a core 182 surrounded by a cladding (not depicted), which can have a differing index of refraction. Accordingly, the optical fiber 180 can function as a waveguide to transmit light via the core 182. The optical fiber 180 can be a single mode fiber (SMF) or a multi-mode fiber (MMF). In some embodiments, the optical fiber 180 can be a multi-mode optical fiber, such as, for example, a large-core, high-numerical-aperture optical fiber, e.g., the VSDN™ optical fiber, available from Corning Incorporated of Corning, N.Y.

The core 182 of each optical fiber 180 can have an index of refraction $n_C$ and the cladding surrounding the core 182 can have an index of refraction $n_{CL}$, where $n_{CL} < n_C$. In an example, the optical fiber 180 has a numerical aperture $NA_F$=0.29. The core 182 may have a gradient-index profile, which in an example is a parabolic profile. In an example, the core 182 has a diameter of about 80 microns. The core 182 and cladding of each optical fiber 180 can be surrounded by a coating 184. The coating 184 may be an acrylate material, for example. In some embodiments, each optical fiber 180 may include an inner first coating having a first diameter (e.g., 125 μm outer diameter) and an outer second coating having a second diameter (e.g., 250 μm outer diameter).

Referring again to FIG. 1, the mating feature 106 of the connector body 104 can be coupled to the optical window 120 such that the exterior surface 122 of the optical window 120 is exposed to allow for contact with a corresponding window. In some embodiments, the exterior surface 122 of the optical window 120 can be flush with or jut out from the connector body 104. For example, in the depicted embodiment, the exterior surface 122 of the optical window 120 can jut out and away from the window support member 108. Alternatively or additionally, the optical window 120 can extend from the connector body 104 such that the exterior surface 122 projects beyond the mating feature 106. In some embodiments, the exterior surface 122 of the optical window 120 can be unobstructed by any portion of the expanded beam optical connector 100.

Referring again to FIG. 2, the core 182 of the optical fiber 180 can be aligned and placed into optical communication with the optical lens 170. Accordingly, the optical fiber 180 can emit a diverging optical signal 10 that can be received with the first face 172 of the optical lens 170. The diverging optical signal 10 can be transformed into a collimated optical signal 12 by the optical lens 170 and emitted via the second face 174 of the optical lens 170.

The optical window 120 can be aligned and placed into optical communication with the optical lens 170 such that the collimated optical signal 12 is received by the interior surface 124 of the optical window 120. As is noted herein above, the optical window 120 can be a multilayered structure that is configured to be transmissive to light. Accordingly, the collimated optical signal 12 can be transmitted through each layer of the optical window 120 and emitted from the exterior surface 122.

In some embodiments, the interior surface 124 of the optical window 120 can be formed from the optical medium 140. The optical medium 140 can be bonded to the optical transition layer 150 at the interface surface 142 of the optical medium 140 and the first interface surface 152 of the optical transition layer 150. The second interface surface 154 of the optical transition layer 150 can be bonded to an interface surface 162 of the diamond-like carbon layer 160. Accordingly, the diamond-like carbon layer 160 can form the exterior surface 122 of the optical window. In some embodiments, the portion of the diamond-like carbon layer 160 that forms the exterior surface 122 of the optical window 120 can be uncoated, i.e., provided without an anti-reflective coating. Additionally, it is noted that in some embodiments the layers of the optical window 120 can be directly bonded to one another. Alternatively or additionally, materials can be utilized between layers to promote bonding.

Various embodiments will be further clarified by the following example.

Example 1.

Figure 3:
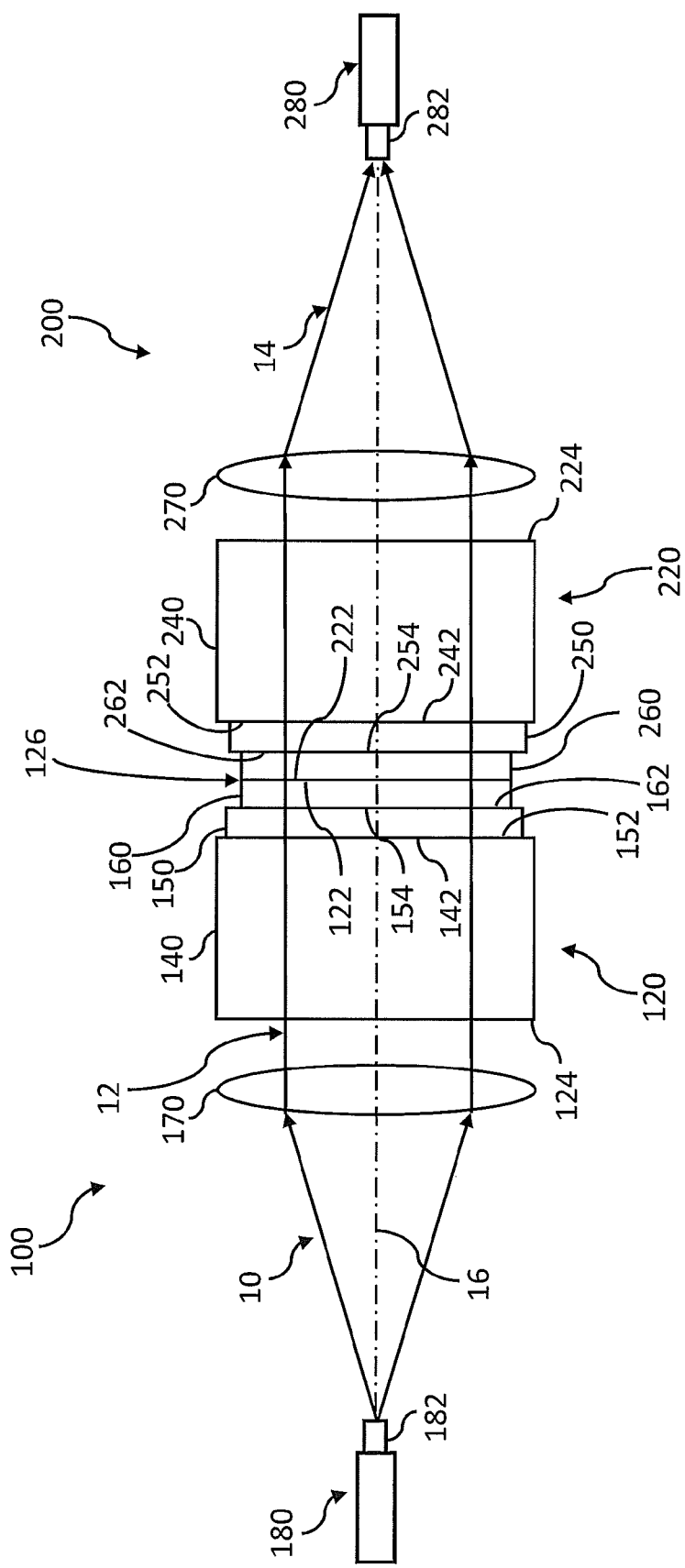
FIG. 3 is a schematic view of one embodiment of an expanded beam optical connector in optical communication with a complementary optical device.

Referring now to FIG. 3, the expanded beam optical connector 100 can be brought into contact with a complementary optical device 200 for low-loss expanded beam optical communication. The complementary optical device 200 can have a substantially similar structure as embodiments of the expanded beam optical connector 100, described herein above. Specifically, the complementary optical device 200 can comprise a mating optical window 220. The mating optical window 220 can have a mating exterior surface 222 and an interior surface 224 with a plurality of layers disposed there between. The interior surface 224 of the mating optical window 220 can be formed from an optical medium 240. The optical medium 240 can be bonded to an optical transition layer 250 at an interface surface 242 of the optical medium 240 and a first interface surface 252 of the optical transition layer 250. The optical transition layer can include a second interface surface 254 that is bonded to an interface surface 262 of the diamond-like carbon layer 260. Accordingly, the diamond-like carbon layer 260 can form the mating exterior surface 222 of the mating optical window 220.

The exterior surface 122 of the expanded beam optical connector 100 and the mating exterior surface 222 of the complementary optical device 200 can be braced to one another. For example, the mating feature 106, the alignment features 110, or both (FIG. 1) of the expanded beam optical connector 100 can be engaged with corresponding features of the complementary optical device 200. The engagement can be mechanical, magnetic, or both. Thus, when so engaged, portions of the exterior surface 122 and the mating exterior surface 222 can be in close contact, i.e., touching with no space or objects in between. Accordingly, when in close contact, each of the exterior surface 122 and the mating exterior surface 222 can have a close contact portion 126 that touches the other object. Without being bound to theory, while it is believed to be unnecessary for the entirety of each of the exterior surface 122 and the mating exterior surface 222 to be in close contact, it is believed that optical communication performance can be improved by having as much overlap as possible between the close contact portion 126 and the path of the collimated optical signal 12. It is believed that such contact can reduce signal loss due to reflection.

In some embodiments, the engagement between the expanded beam optical connector 100 and the complementary optical device 200 can hold the exterior surface 122 and the mating exterior surface 222 in forcible contact, i.e., a force can be transferred from one of the exterior surface 122 and the mating exterior surface 222 to the other. It is noted that, while the expanded beam optical connector 100 is depicted as transmitting the collimated optical signal 12 and the complementary optical device 200 is depicted as receiving the collimated optical signal 12, each of the expanded beam optical connector 100 and the complementary optical device 200 can transmit, receive, or both. Accordingly, each of the optical window 120 and mating optical window 220 can be configured as a transmission window, a receive window, or both (i.e., transmit/receive window).

The complementary optical device 200 can further comprise an optical lens 270 and an optical fiber 280, which are substantially similar to the embodiments of the optical lens 170 and the optical fiber 180 described above. The optical lens 270 can be in optical communication with the interior surface 224 of the mating optical window 220. When the optical window 120 and the mating optical window 220 are brought into close contact, the optical fiber 180, the optical lens 170, the optical lens 270, and the optical fiber 280 can be aligned along a central axis 16. Accordingly, the optical lens 170 can be configured to receive a diverging optical signal 10 from the core 182 of the optical fiber 180 and transform the diverging optical signal 10 into a collimated optical signal 12 (or otherwise optically conditioned) for receipt by the optical window 120.

The collimated optical signal 12 can be transmitted through the optical window 120 for receipt by the complementary optical device 200. Specifically, the collimated optical signal 12 can be transmitted to the mating optical window 220 via the close contact portion 126 of the exterior surface 122 and the mating exterior surface 222. The collimated optical signal 12 can be communicated from the mating optical window 220 to the optical lens 270. The optical lens 270 can transform the collimated optical signal 12 into a converging optical signal 14 and communicate the converging optical signal 14 to the core 282 of the optical fiber 280.

It should now be understood that the embodiments described herein can be utilized for low loss optical communication. Specifically, optical connectors can be provided with optical windows having an optical medium bonded to a protective layer via an optical transition layer. Associated pairs of optical windows can be mated by placing corresponding protective layers in close contact to provide a direct optical coupling wherein light signals propagate between the optical connectors with reduced losses. Moreover, the protective layers can be robust (resisting scratches and pitting) and allow for cleaning to reduce contamination of the optical windows. Accordingly, signal loss due to contamination can be reduced.

It is noted that although the optical windows are shown in connection with a single lens element and optical element in FIGS. 2 and 3, persons skilled in the art will appreciate that these figures a merely schematic. The principles discussed above may apply to embodiments where the connector body includes multiple (e.g., 2, 4, etc.) lens elements sharing a common optical window, similar to FIG. 1. The connector body may also include multiple optical elements in such embodiments. For example, the connector body may include multiple channels for multiple optical fibers.

It is also noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An expanded beam optical connector comprising:
a connector body, an optical element in the form of a waveguide or active device, a beam width altering optical lens, and a transmit/receive window, wherein:
the optical element, the beam width altering optical lens and the transmit/receive window are arranged and structurally configured such that optical signals propagate between the optical element and the transmit/receive window via the beam width altering optical lens, wherein the beam width altering optical lens alters a beam width of the optical signals;
the transmit/receive window comprises an optical medium that forms an interior surface of the transmit/ receive window, an optical transition layer bonded to the interior surface formed by the optical medium, and a protective layer forming an exterior surface of the transmit/receive window; and the connector body is structurally configured and arranged to place the exterior surface of the transmit/receive window in close contact with a mating exterior surface of a mating transmit/receive window of a complementary optical device to define a close contact portion on the transmit/receive window and the mating transmit/receive window.

2. The expanded beam optical connector of claim 1, wherein the optical medium has a first refractive index, the optical transition layer has a second refractive index, and the protective has a third refractive index, the second refractive index of the optical transition layer being greater than the first refractive index of the optical medium and less than the third refractive index of the protective layer.

3. The expanded beam optical connector of claim 2, wherein the protective layer has a refractive index of about 2, the optical transition layer has an optical transition layer refractive index of about $\sqrt{3}$, and the optical medium has an optical medium refractive index of about 1.5.

4. The expanded beam optical connector of claim 1, wherein the protective layer has a hardness greater than about 10 GPa.

5. The expanded beam optical connector of claim 4, wherein the hardness is measured using the Berkovich method.

6. The expanded beam optical connector of claim 1, wherein the protective layer has a thickness from about 500 nm to about 5 μm.

7. The expanded beam optical connector of claim 1, wherein the optical medium is formed from glass.

8. The expanded beam optical connector of claim 7, wherein the protective layer comprises a diamond-like carbon.

9. The expanded beam optical connector of claim 8, wherein the optical transition layer is formed from silicon oxynitride.

10. The expanded beam optical connector of claim 1, wherein the optical transition layer is formed from silicon oxynitride.

11. The expanded beam optical connector of claim 1, wherein the close contact portion of the exterior surface of the transmit/receive window is substantially flat.

12. The expanded beam optical connector of claim 1, wherein the optical signals have a wavelength λ, and the optical transition layer has a thickness of about λ/4.

13. The expanded beam optical connector of claim 1, wherein the complementary optical device is a plug and the expanded beam optical connector is a receptacle.

14. The expanded beam optical connector of claim 1, wherein the complementary optical device is a receptacle and the expanded beam optical connector is a plug.

15. An optical connector assembly comprising an expanded beam optical connector and a complementary optical device, wherein:

the expanded beam optical connector comprises a mating feature, an optical element in the form of a waveguide or active device, a beam width altering optical lens, and a transmit/receive window;

the transmit/receive window comprises an optical medium that forms an interior surface of the transmit/receive window, an optical transition layer bonded to the interior surface formed by the optical medium, and a protective layer forming an exterior surface of the transmit/receive window;

the complementary optical device comprises a complementary mating feature and a mating optical window having a mating exterior surface formed from a protective layer;

the mating feature of the expanded beam optical connector and the complementary mating feature of the complementary optical device are engaged;

the mating exterior surface of the mating optical window is held in close contact with the exterior surface of the transmit/receive window to define a close contact portion on each of the mating exterior surface of the mating optical window and the exterior surface of the transmit/receive window; and when optical signals are transmitted through the close contact portion of the transmit/receive window:

the optical signals are communicated between the transmit/receive window and the beam width altering optical lens;

the beam width altering optical lens alters a beam width of the optical signals; and the optical signals are communicated between the beam width altering optical lens and the optical element.

16. The optical connector assembly of claim 15, wherein a force is transferred between the close contact portion of the mating exterior surface of the mating optical window and the exterior surface of the transmit/receive window, while the mating feature of the expanded beam optical connector and the complementary mating feature of the complementary optical device are engaged.

17. The optical connector assembly of claim 15, wherein the mating feature is mechanical, magnetic, or both.

18. The optical connector assembly of claim 15, wherein the complementary optical device is a complementary expanded beam optical connector.

19. The optical connector assembly of claim 15, wherein the optical medium of the expanded beam optical connector is formed from glass, the protective layer of the expanded beam optical connector comprises a diamond-like carbon, and the optical transition layer of the expanded beam optical connector is formed from silicon oxynitride.

20. A method for forming an optical connection across an expanded beam optical connector and a complementary optical device, wherein:

the expanded beam optical connector comprises a connector body, an optical element in the form of a waveguide or active device, a beam width altering optical lens, and a transmit/receive window;

the optical element, the beam width altering optical lens, and the transmit/receive window are arranged and structurally configured such that optical signals propagate between the optical element and the transmit/receive window via the beam width altering optical lens, wherein the beam width altering optical lens alters a beam width of the optical signals;

the transmit/receive window comprises an optical medium that forms an interior surface of the transmit/receive window, an optical transition layer formed from silicon oxynitride bonded to the interior surface formed by the optical medium, and a protective layer forming an exterior surface of the transmit/receive window;

the complementary optical device comprises a mating optical window having a mating exterior surface formed from a protective layer;

the connector body of the expanded beam optical connector is structurally configured and arranged to place the exterior surface of the transmit/receive window of the expanded beam optical connector in close contact with the mating exterior surface of the mating optical window of the complementary optical device to define a close contact portion on the exterior surface of the transmit/receive window and the mating exterior surface of the mating optical window; and the method comprises connecting the expanded beam optical connector and the complementary optical device to brace the transmit/receive window of the expanded beam optical connector against the mating optical window of the complementary optical device to define the close contact portion on the transmit/receive window of the expanded beam optical connector and the mating optical window of the complementary optical device.

21. An expanded beam optical connector comprising:

a connector body, an optical element in the form of a waveguide or active device, a beam width altering optical lens, and a multilayered transmit/receive window, wherein:

the optical element, the beam width altering optical lens and the multilayered transmit/receive window are arranged and structurally configured such that optical signals propagate between the optical element and the multilayered transmit/receive window via the beam width altering optical lens, wherein the beam width altering optical lens alters a beam width of the optical signals;

the multilayered transmit/receive window comprises an optical medium formed from glass that defines an interior surface of the multilayered transmit/receive window, an optical transition layer between the interior surface defined by the optical medium, and a protective layer forming an exterior surface of the multilayered transmit/receive window;

the optical transition layer is bonded to the interior surface formed by the optical medium, and the protective layer is bonded to the optical transition layer such that an optical signal is capable of being transmitted through the optical medium, the optical transition layer and the protective layer; and the connector body is structurally configured and arranged to place the exterior surface of the multilayered transmit/receive window in close contact with a mating exterior surface of a mating multilayered transmit/receive window of a complementary optical device to define a close contact portion on the multilayered transmit/receive window and the mating multilayered transmit/receive window.

* * * * *